United States Patent
Nelson et al.

(10) Patent No.: US 9,875,070 B2
(45) Date of Patent: *Jan. 23, 2018

(54) METHOD FOR VIEWING AND PRINTING DOUBLE-SIDED ITEMS

(71) Applicant: CCL Label, Inc., Framingham, MA (US)

(72) Inventors: Bradley K. Nelson, Santa Rosa, CA (US); Phillip W. McGee, Chino Hills, CA (US)

(73) Assignee: CCL LABEL, INC., Framingham, MA (US)

( * ) Notice: Subject to any disclaimer, the term of this patent is extended or adjusted under 35 U.S.C. 154(b) by 586 days.

This patent is subject to a terminal disclaimer.

(21) Appl. No.: 14/474,764

(22) Filed: Sep. 2, 2014

(65) Prior Publication Data

US 2015/0205545 A1    Jul. 23, 2015

Related U.S. Application Data

(63) Continuation of application No. 12/054,358, filed on Mar. 24, 2008, now Pat. No. 8,826,124.

(Continued)

(51) Int. Cl.
*G06F 17/00* (2006.01)
*G06F 3/12* (2006.01)
(Continued)

(52) U.S. Cl.
CPC .......... *G06F 3/1208* (2013.01); *G06F 3/1253* (2013.01); *G06F 17/212* (2013.01); *G06T 11/60* (2013.01)

(58) Field of Classification Search
CPC ................ G06F 17/212; G06F 17/25
See application file for complete search history.

(56) References Cited

U.S. PATENT DOCUMENTS 5,649,216 A    7/1997   Sieber
5,666,208 A    9/1997   Farrell et al.
(Continued)

FOREIGN PATENT DOCUMENTS

EP    1577099 A2    9/2005

OTHER PUBLICATIONS

Patent Cooperation Treaty (PCT), International Search Report and Written Opinion for Application PCT/US2008/058069 filed Mar. 24, 2008, dated Aug. 5, 2008, 12pgs., International Searching Authority, US.

(Continued)

*Primary Examiner* — Stephen Hong
*Assistant Examiner* — Gregory Vaughn
(74) *Attorney, Agent, or Firm* — McDonald Hopkins LLC

(57) ABSTRACT

A method for displaying indicia that is to be printed on a double-sided item on a computer screen. The double-sided item has first and second surfaces. The indicia has at least one print orientation when the indicia is printed on the item's first and second surfaces, and at least one view orientation when the indicia is displayed on the computer screen, which has a vertical orientation. The method includes providing information that characterizes the indicia's print orientation, using the information to compare the print orientation to the vertical orientation; and if, as a result of the comparison, the print orientation does not match the vertical orientation, adjusting the view orientation so the view orientation matches the vertical orientation while maintaining the indicia's print orientation when the indicia is printed on the item.

20 Claims, 14 Drawing Sheets

Related U.S. Application Data

(60) Provisional application No. 60/896,929, filed on Mar. 25, 2007.

(51) Int. Cl.
*G06F 17/21* (2006.01)
*G06T 11/60* (2006.01)

(56) References Cited

U.S. PATENT DOCUMENTS

| | | |
|---|---|---|
| 6,293,592 B1 | 9/2001 | Robertson et al. |
| 6,909,526 B1 | 6/2005 | Dawe |
| 6,927,865 B1 | 8/2005 | Kujirai et al. |
| 6,980,318 B1 | 12/2005 | Silverbrook et al. |
| 7,127,843 B2 | 10/2006 | Swank |
| 7,207,001 B2 | 4/2007 | Bailey et al. |
| 7,386,269 B2 | 6/2008 | Miyazaki |
| 7,602,515 B2 | 10/2009 | Silverbrook et al. |
| 2001/0033078 A1 | 10/2001 | Robertson et al. |
| 2002/0116421 A1* | 8/2002 | Fox .......... G06F 17/21 715/201 |
| 2002/0154338 A1* | 10/2002 | Tanaka .......... H04N 1/00132 358/1.18 |
| 2002/0164181 A1 | 11/2002 | Parker et al. |
| 2003/0085870 A1* | 5/2003 | Hinckley .......... G06F 1/1626 345/156 |
| 2004/0141207 A1* | 7/2004 | Warmus .......... B42C 19/00 358/1.18 |
| 2004/0190011 A1 | 9/2004 | Walker et al. |
| 2004/0216046 A1* | 10/2004 | Warmus .......... B42C 19/00 715/256 |
| 2005/0024683 A1* | 2/2005 | Liu .......... H04N 1/00132 358/1.18 |
| 2005/0152002 A1* | 7/2005 | Shirakawa .......... H04N 1/3871 358/1.18 |
| 2005/0157186 A1* | 7/2005 | Tsuji .......... H04N 5/272 348/231.3 |
| 2005/0168775 A1 | 8/2005 | Liu |
| 2005/0206915 A1 | 9/2005 | Uejo et al. |
| 2005/0213156 A1 | 9/2005 | Kang et al. |
| 2006/0064907 A1 | 3/2006 | Sturba et al. |
| 2006/0136307 A1* | 6/2006 | Hays .......... G06F 17/21 705/26.1 |
| 2006/0204134 A1* | 9/2006 | Modrall .......... H04N 1/00442 382/291 |
| 2007/0024901 A1* | 2/2007 | Kayama .......... G06F 3/1204 358/1.15 |
| 2007/0061762 A1* | 3/2007 | Hymel .......... B42D 15/00 715/866 |
| 2007/0234205 A1 | 10/2007 | Lloyd et al. |

OTHER PUBLICATIONS

European Patent Office, Extended European Search Report for Application EP08744280.2, PCT/US2008058069, dated Mar. 7, 2012, 6pgs., European Patent Office, Germany.

European Patent Office, Communication from the Examining Division for Application EP08744280.2, dated Jul. 27, 2015, 6pgs., European Patent Office, Germany.

Patent Cooperation Treaty (PCT), International Preliminary Report on Patentability for Application PCT/US2008/058069 filed Mar. 24, 2008, dated Mar. 29, 2011, 14pgs., International Preliminary Examining Authority, US.

* cited by examiner

METHOD FOR VIEWING AND PRINTING DOUBLE-SIDED ITEMS

CROSS-REFERENCE TO RELATED PATENT APPLICATION

The present application is a continuation of U.S. application Ser. No. 12/054,358, filed Mar. 24, 2008, entitled "Method for Viewing and Printing Double-Sided Items," now U.S. Pat. No. 8,826,124, which claims the priority date of U.S. Provisional Patent Application Ser. No. 60/896,929, filed Mar. 25, 2007, entitled "Software Template Reverse Side View and Printing Normalization," all of which are hereby incorporated by reference.

FIELD OF THE INVENTION

The present invention generally relates to the double-sided printing of items. More specifically, the present invention relates to the double-sided printing of greeting cards, note cards, postcards, brochures, business cards, and the like.

BACKGROUND

Currently, double-sided printing of an item, for example, a greeting card, a note card, a postcard, a brochure, or a business card, can be complicated. Each side of the item can include indicia, e.g., print or images, that is printed right side up, and other indicia that is printed upside down, even on the same side/surface of the item. This especially is the case where the item is configured to be folded after printing. Accordingly, it should, therefore, be appreciated that there is a need for a simplified method for printing indicia on both surfaces of a dual-sided item. The present invention satisfies this need as well as others.

SUMMARY

An exemplary method according to the invention is a method for displaying indicia that is to be printed on a double-sided item on a computer screen for viewing by a user. The double-sided item has a first surface and a second surface, the indicia has at least one print orientation when the indicia is printed on the item's first and second surfaces, the indicia has at least one view orientation when the indicia is displayed on the computer screen, and the computer screen has a vertical orientation. The method includes the following: providing information that characterizes the indicia's at least one print orientation; using the information to compare the indicia's at least one print orientation to the computer screen's vertical orientation; and if, as a result of the comparison, the indicia's at least one print orientation does not match the computer screen's vertical orientation, adjusting the indicia's at least one view orientation so the indicia's at least one view orientation matches the computer screen's vertical orientation. The indicia's at least one print orientation, when the indicia are printed on the double-sided items is maintained.

In other, more detailed features of the invention, the step of adjusting the indicia's at least one view orientation involves rotating the indicia's at least one view orientation 180 degrees if the indicia's at least one print orientation is inverted with respect to the computer screen's vertical orientation. Also, the step of adjusting the indicia's at least one view orientation can involve rotating the indicia's at least one view orientation 90 degrees if the indicia's at least one print orientation is perpendicular to the computer screen's vertical orientation. In addition, the step of adjusting the indicia's at least one view orientation ensures that the user will view the indicia right side up on the computer screen.

In other, more detailed features of the invention, the method further includes providing a graphical representation of a sheet that includes the double-sided item and is configured to be displayed on the computer screen for viewing by the user. The indicia are displayed on the computer screen in conjunction with the graphical representation of the sheet. The graphical representation of the sheet that includes the double-sided item can be a template. Also, the double-sided item can be a note card, a greeting card, a postcard, a brochure, or a business card.

An exemplary embodiment is a computer-readable medium that is configured to interface with a computer, and contains a program that is configured to prompt the display of indicia that is to be printed on a double-sided item on a computer screen for viewing by a user. The double-sided item has a first surface and a second surface. The indicia have at least one print orientation when the indicia are printed on the item's first and second surfaces. The indicia have at least one view orientation when the indicia are displayed on the computer screen, and the computer screen has a vertical orientation. The program includes information that is used to prompt the display of the indicia on the computer screen, where the program receives data that characterizes the indicia's at least one print orientation and the computer screen's vertical orientation, the program uses the data during a comparison of the indicia's at least one print orientation to the computer screen's vertical orientation, and if the program determines, as a result of the comparison, that the indicia's at least one print orientation does not match the computer screen's vertical orientation, the program adjusts the indicia's at least one view orientation so the indicia's at least one view orientation matches the computer screen's vertical orientation while maintaining the indicia's at least one print orientation when the indicia is printed on the double-sided item.

In other, more detailed features of the invention, the program further includes additional information that the program is configured to use to prompt the printing of the indicia on the double-sided item by a printer that is coupled to the computer. Also, the printer can be a top-feed printer or a bottom-feed printer. In addition, the program can further include a flag that is configured to prompt the printer to print the indicia on the double-sided item in an inverted manner.

Another exemplary method according to the invention is a method for displaying a graphical representation of a sheet that includes a plurality of double-sided items on a computer screen for viewing by a user. The sheet has a first surface, a second surface, and at least one dimension. The sheet is configured to be printed with indicia on both the first surface and the second surface of the sheet. Each of the plurality of double-sided items has a first print location on the first surface and a second print location on the second surface. The method includes the following: providing information that characterizes the second print location of each of the plurality of double-sided items on the sheet's second surface and the at least one dimension of the sheet, using the information to determine a view orientation for each of the plurality of double-sided items on the second surface relative to a graphical representation of the sheet's second surface, and using the view orientation to display a graphical representation of each of the plurality of double-sided items along with the graphical representation of the sheet's second surface on the computer screen. The view orientation for each of the plurality of double-sided items on the sheet's second surface corresponds to the first print location of the item on the sheet's first surface.

In other, more detailed features of the invention, the method further includes the following: providing additional information that characterizes the first print location of each of the plurality of double-sided items on the sheet's first surface, using the additional information to determine an additional view orientation for each of the plurality of double-sided items on the first surface relative to a graphical representation of the sheet's first surface, and using the additional view orientation to display the graphical representation of each of the plurality of double-sided items along with the graphical representation of the sheet's first surface on the computer screen. The additional view orientation for each of the plurality of double-sided items on the sheet's first surface corresponds to the first print location of the item on the sheet's first surface.

Another exemplary embodiment is a computer-readable medium that is configured to interface with a computer, and contains a program that is configured to prompt the display of a graphical representation of a sheet that includes a plurality of double-sided items on a computer screen for viewing by a user. The sheet has a first surface, a second surface, and at least one dimension. The sheet is configured to be printed with indicia on both the first surface and the second surface of the sheet. Each of the plurality of double-sided items has a first print location on the first surface and a second print location on the second surface. The program includes information that is used to prompt the display of the graphical representation of the sheet on the computer screen. The program receives data that characterizes the second print location of each of the plurality of double-sided items on the sheet's second surface and the at least one dimension of the sheet. The program uses the data to determine a view orientation for each of the plurality of double-sided items on the second surface relative to a graphical representation of the sheet's second surface. The program uses the view orientation to display a graphical representation of each of the plurality of double-sided items along with the graphical representation of the sheet's second surface on the computer screen. The view orientation for each of the plurality of double-sided items on the second surface corresponds to the first print location of the item on the first surface for the item.

In other, more detailed features of the invention, the program further includes additional information that the program is configured to use to do the following: characterize the first print location of each of the plurality of double-sided items on the sheet's first surface, determine an additional view orientation for each of the plurality of double-sided items on the first surface relative to a graphical representation of the sheet's first surface, and use the additional view orientation to prompt the display of the graphical representation of each of the plurality of double-sided items along with the graphical representation of the sheet's first surface on the computer screen. The additional view orientation for each of the plurality of double-sided items on the sheet's first surface corresponds to the first print location of the item on the sheet's first surface.

In other, more detailed features of the invention, the program further includes additional information that the program is configured to use to prompt the printing of the indicia on the sheet by a printer that is coupled to the computer. Also, the program can be configured to include additional information that the program is configured to use to prompt the user to reinsert the sheet into the printer in a specific sheet orientation after indicia has been printed on the sheet's first surface. In addition, the program can further include additional information that the program is configured to use to prompt the display of each of the plurality of double-sided items on the computer screen in a portrait orientation even if the sheet will be printed in a landscape orientation.

Other features of the invention should become apparent to those skilled in the art from the following description of the preferred embodiments taken in conjunction with the accompanying drawings, which illustrate, by way of example, the principles of the invention, the invention not being limited to any particular preferred embodiment(s) disclosed.

BRIEF DESCRIPTION OF THE DRAWINGS

These and other features, aspects, and advantages of the present invention will become better understood with reference to the following description, appended claims, and accompanying drawings, where:

Unless otherwise indicated, the illustrations in the above figures are not necessarily drawn to scale.

DETAILED DESCRIPTION

Figure 1:
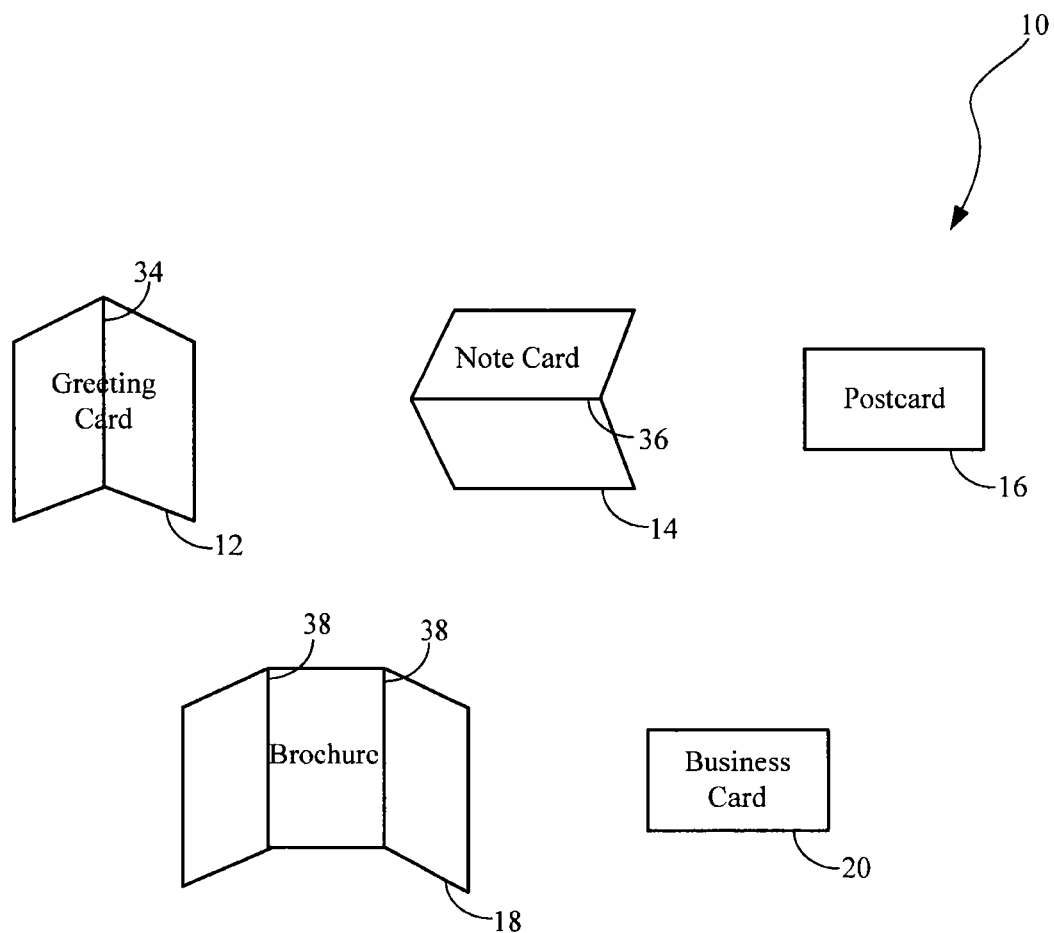
FIG. 1 includes elevational views of various double-sided items including a greeting card, a note card, a postcard, a brochure, and a business card.
Figure 2:
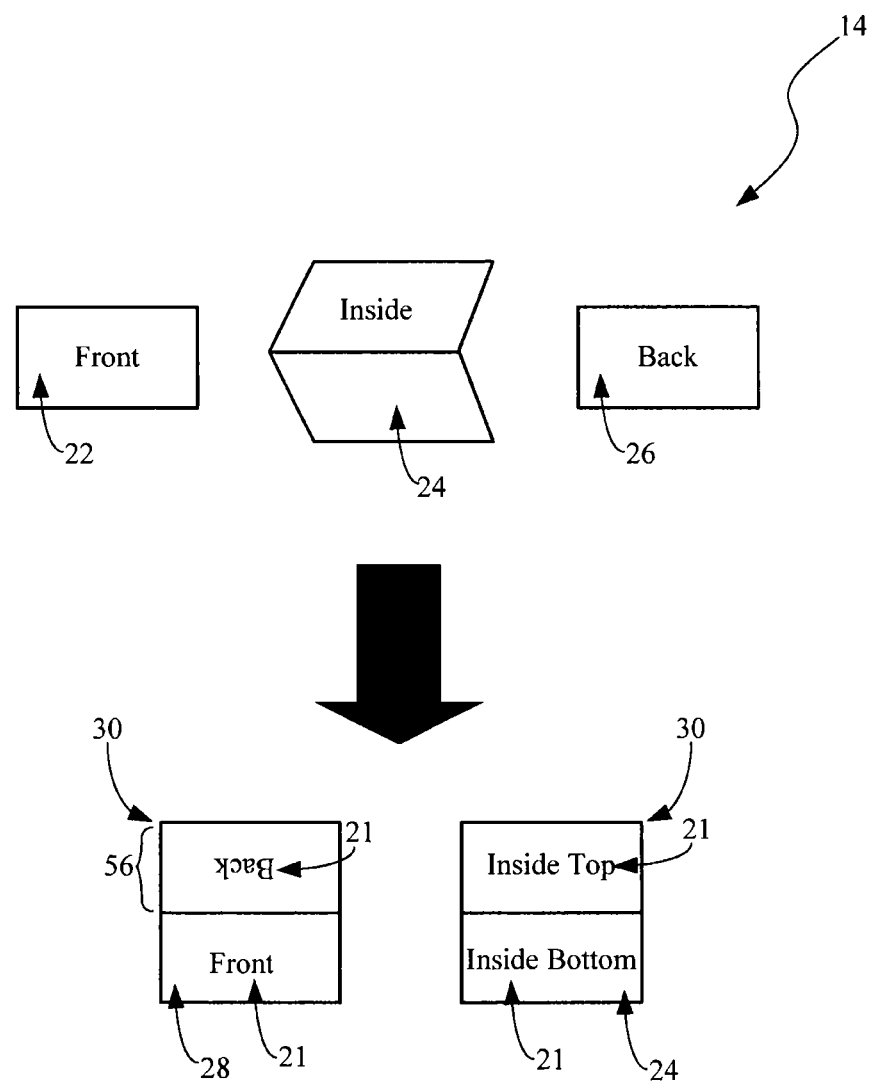
FIG. 2 includes views of an example note card including elevational views of the note card's front face, inside surface, and back face in folded configurations, and plan views of a sheet that is used to form the note card including a plan view of the sheet's front or first surface and a plan view of the sheet's back or second surface.

Referring to FIG. 1, the process of using a template that is designed for viewing indicia, e.g., print and/or an images on a double-sided item 10, e.g., a greeting card 12, a note card 14, a postcard 16, a brochure 18, or a business card 20, and then printing the double-sided item can be a complex issue. The complexity of viewing and printing the indicia on the double-sided item is further complicated when attempts are made to edit the indicia prior to printing. Also, the process of how the item (when in the form of sheet and not folded) is inserted, and possibly reinserted, into a printer during the printing process so that both sides of the item are printed correctly can be complicated. For example, referring additionally to FIG. 2, it might be desired to edit indicia 21 on the front face 22, the inside face 24, and the back face 26 of a note card, in that order. Yet for printing purposes, the front and back faces are grouped for printing on a first surface 28 of the note card sheet 30, and the inside face 24 is the opposite side, also referred to as the second surface, of the note card sheet. The back face 26 will be printed upside down since the note card is folded, as shown in FIGS. 1 and 2. So, referring additionally to FIGS. 3A, 3B, and 3C, the issue becomes, how the note card sheet is reinserted into a printer 32 in order to ensure that the both surfaces/sides 24 and 28 of the note card are printed correctly, including making sure that the indicia, e.g., print and/or images, are printed in the correct orientation, e.g., right side up or upside down.

Referring again to FIG. 1, each double-sided item 10, e.g., a greeting card 12 having a single vertical fold 34, a note card 14 having a single horizontal fold 36, a postcard 16 having no fold, a brochure 18 having two vertical folds 38, and a business card 20, has its own rule for viewing and printing. For example, as shown in the examples of FIG. 1, the greeting and note cards are folded once, while the postcards and business cards are not folded, and the brochure has more than one fold.

Figure 4:
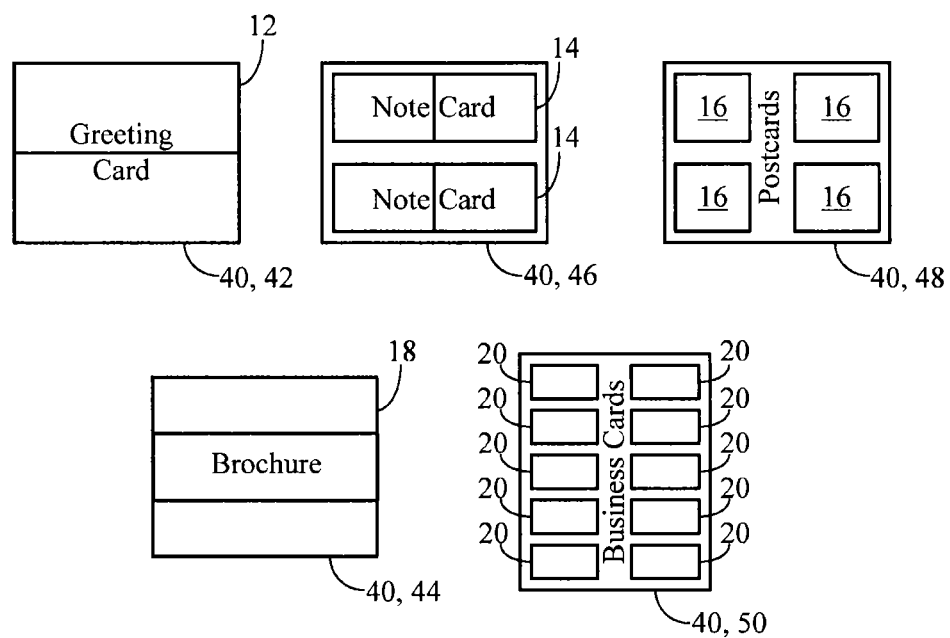
FIG. 4 includes plan views of sheets that include example items including a greeting card, note cards, postcards, a brochure, and business cards.

Referring additionally to FIG. 4, the quantity of items 10 on a sheet 40 can also have an impact on viewing and printing. A greeting card 12 or brochure 18 may only include one card per sheet 42 and 44, respectively. A sheet 46 of note cards 14 can include two or more note cards. A sheet 48 of postcards 16 might include four or more postcards, as shown in FIG. 4. A sheet 50 of business cards 20 can include eight or ten business cards, or more. Each of these items can be double-sided for printing and viewing. The requirement for editing and printing these double-sided items varies from design to design.

Figure 3A:
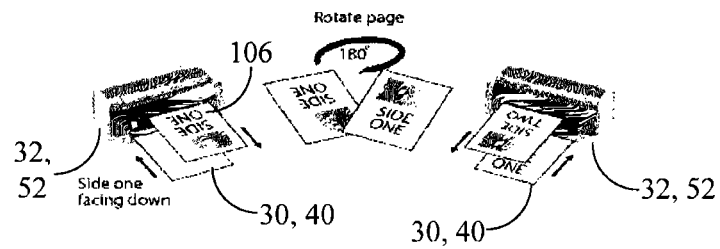
FIGS. 3A, 3B, and 3C include perspective views of example printers including perspective views of a bottom-feed printer (FIG. 3A) and perspective views of a top-feed printer (FIGS. 3B and 3C), and the process for flipping/rotation a sheet before reinsertion of the sheet into each type of printer.

Referring again to FIGS. 3A, 3B, and 3C, the type of printer 32 also impacts how a sheet 40 needs to be reinserted to facilitate double-sided printing. For example, bottom-feed printers 52 have different insertion needs in comparison to top-feed printers 54. Also, given the type of item 10, its design, and the quantity of items on a sheet, the reinsertion of the item into a printer can differ dramatically. For example, the reinsertion needs for a greeting card 12 will differ from those of a brochure 18, as will the reinsertion needs between a note card 14 and a postcard 16. As shown in FIG. 3A, when a bottom-feed printer is used, a user may need to rotate the sheet, but the sheet need not be flipped as shown in the case of a top-feed printer in FIG. 4B.

Figure 5:
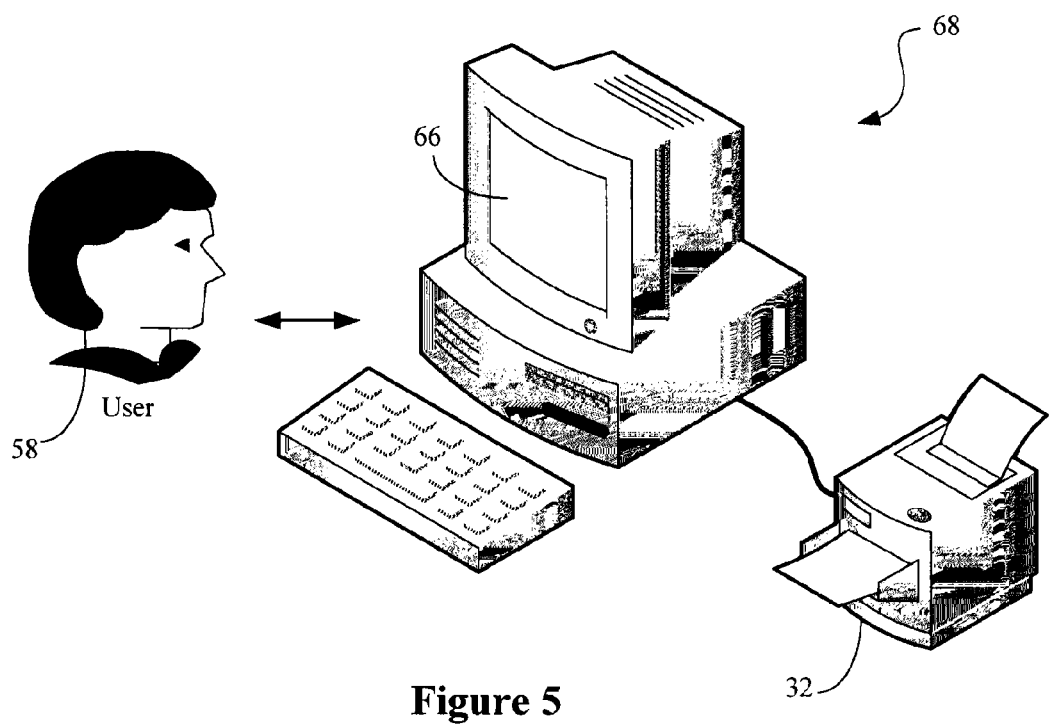
FIG. 5 is a perspective view of a user interfacing with a computer that is coupled to a printer.
Figure 6:
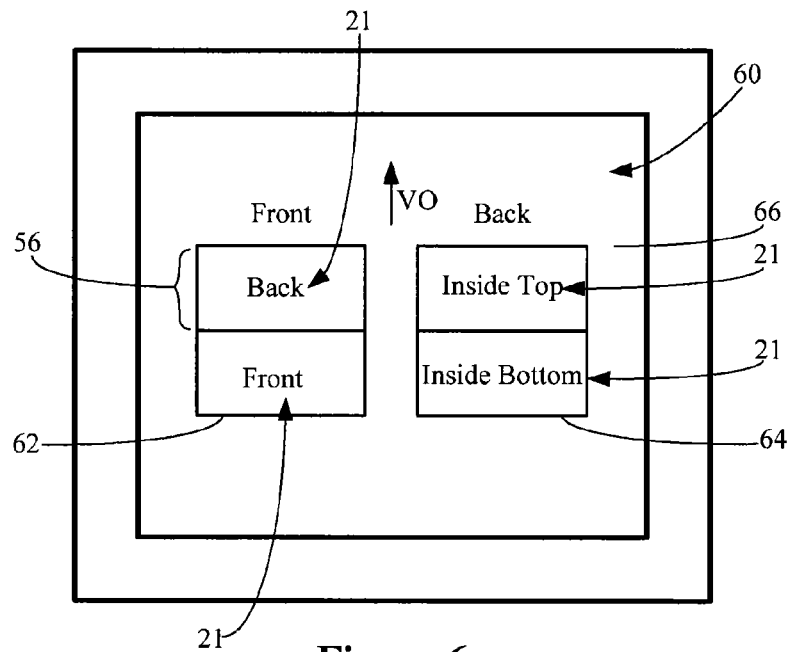
FIG. 6 is an elevational view of a computer screen displaying a template according to a preferred embodiment for an exemplary greeting card.

Referring again to the greeting card 12 illustrated in FIG. 2, the top portion 56 of the back or second surface 28 of the greeting card must be printed upside down in order for the printed indicia 21 to be in the correct print orientation when the greeting card is folded closed (note: when the greeting card is fully open, the indicia on the top portion of the back surface is upside down). Referring additionally to FIGS. 5 and 6, a user 58 of a template 60 (the template will take different forms depending upon the item's design, for example, in FIG. 6, the template includes a graphical representation of the front surface 62 and a graphical representation of a back surface 64 of the sheet 42 having a greeting card) that is displayed on the screen 66 of a computer 68 does not view a design, as shown on the template, with any upside down print on the top portion 56 of the greeting card's back surface, because this would be confusing to the user when editing the design, e.g., adding text and/or graphics to the design of the item. As shown in FIG. 5, the computer is coupled to a printer 32.

Figure 3B:
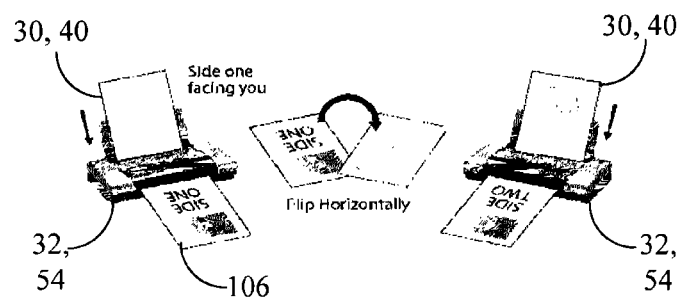
Figure 3C:
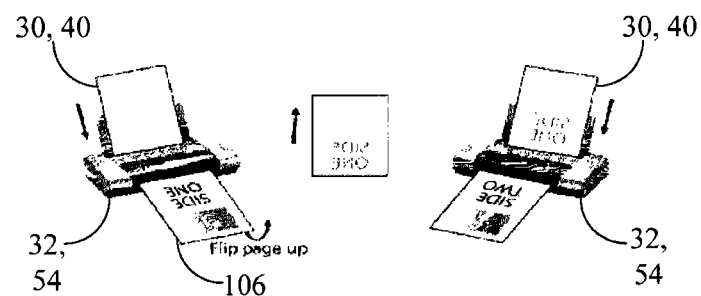

Also, there can be confusion with respect to what "landscape" versus "portrait" means when dealing with a folded item 10, e.g., a greeting card 12, a note card 14, or a brochure 18, or when more then one item 10 is on a sheet 40. A landscape greeting card is viewed as a portrait sheet when it is printed, as shown in FIGS. 3A, 3B, and 3C. A landscape postcard 16, as shown in FIGS. 3A, 3B, and 3C, (with four postcards on a sheet) is actually viewed as a landscape sheet when it is printed. This impacts how the designs for the items are viewed in software that generates the template 60 and/or the software used for printing the items.

Figure 7:
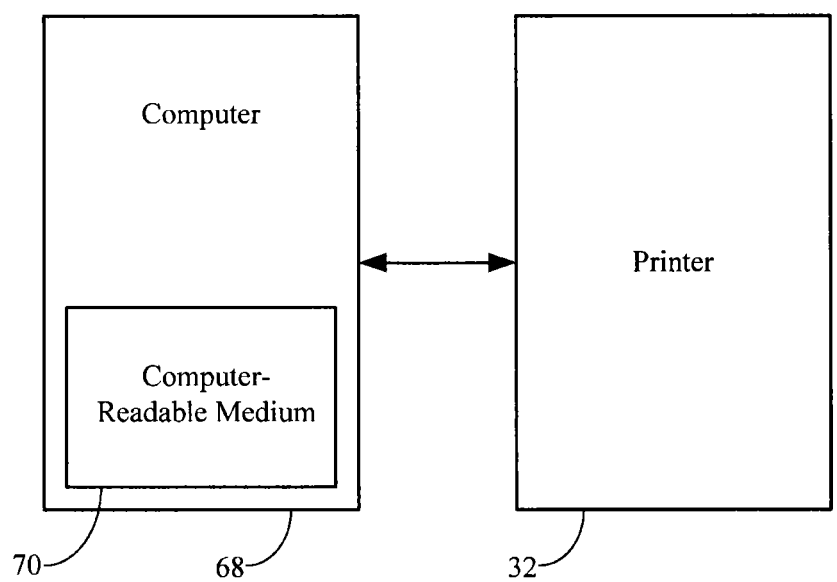
FIG. 7 is a block diagram of a computer including a computer-readable medium and a printer that is coupled to the computer.

The software program that includes information, e.g., computer code and data, that is used by program as prompted by the user 58 to display, create, and/or manipulate the templates 60 that are used to print indicia 21 on a item 10 is stored in at least one computer-readable medium 70, as shown in FIG. 7. The computer-readable medium can be anything that is used to store, communicate, propagate, or transport a program for use by the computer 68, for example, the computer-readable medium can be a an electronic, magnetic, optical, electromagnetic, infrared, or semiconductor system, apparatus, device, or propagation medium. Specific examples of a computer-readable medium include a random access memory ("RAM"), a read-only memory ("ROM"), an erasable programmable read-only memory (e.g., an EPROM, EEPROM, or Flash memory), a compact disc read-only memory ("CDROM"), a digital video disc ("DVD"), a portable computer diskette, a magnetic cassette, a magnetic tape, a magnetic disk drive, a rewritable optical disk, or any other medium that can be used to store information. While one computer-readable medium is shown in FIG. 7, it should be understood by those having ordinary skill in the art that the computer program, or one or more portions of the computer program can be stored on more than one computer-readable medium.

Figure 8:
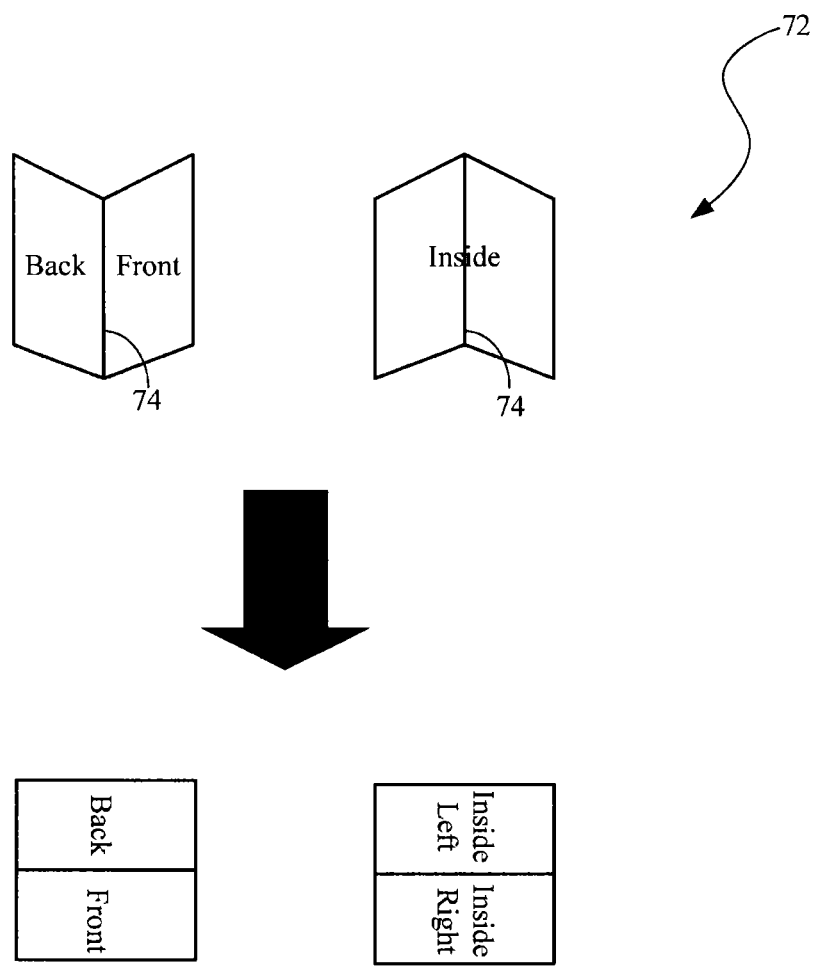
FIG. 8 includes views of an example greeting card including elevational views of the note card's front and back faces and inside surface in folded configurations, and plan views of a sheet that is used to form the greeting card including a plan view of the sheet's front or first surface and a plan view of the sheet's back or second surface.
Figure 9:
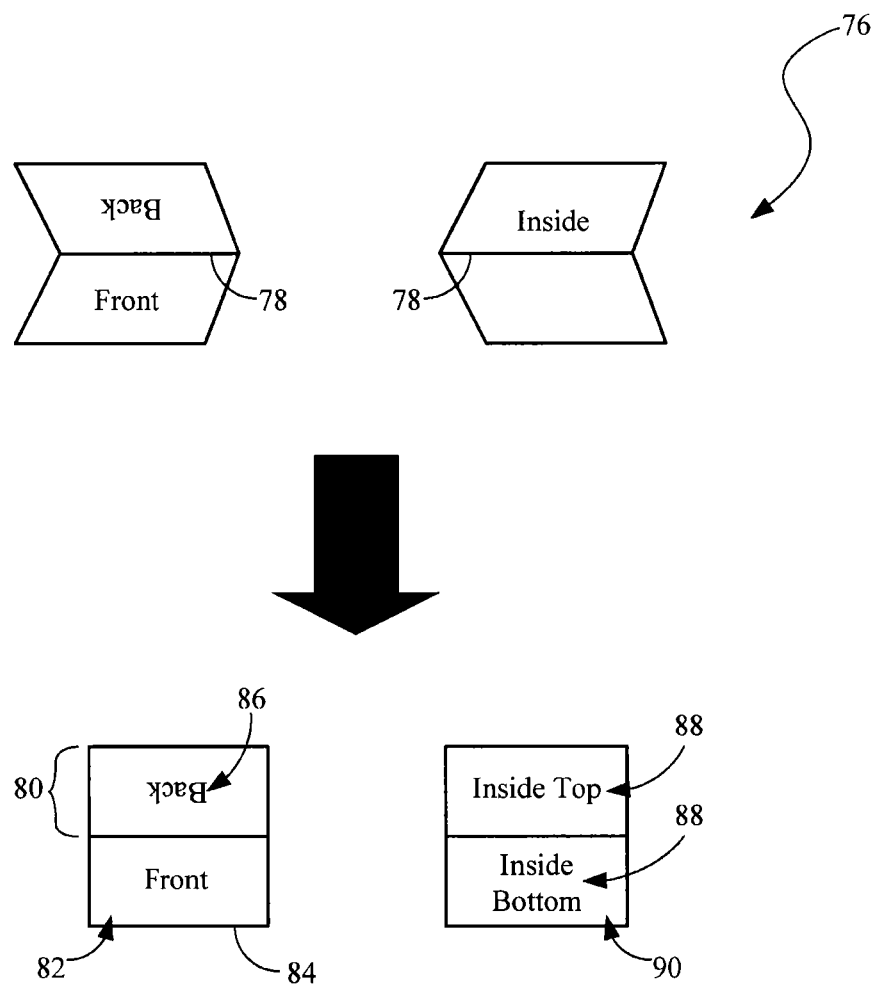
FIG. 9 includes views of another example greeting card including elevational views of the note card's front and back faces and inside surface in folded configurations, and plan views of a sheet that is used to form the greeting card including a plan view of the sheet's front or first surface and a plan view of the sheet's back or second surface.

The different orientations of an items design also can impact the viewing and printing of the item 10. Referring to FIG. 8, a tall greeting card 72 that includes a vertical fold 74 can be viewed using a template 60 as a landscape sheet 42 when editing. However, for printing, the sheet needs to be inserted into a printer 32 in a portrait manner, and thus, all of the printed indicia 21, e.g., text and/or graphics, needs to be rotated 90 degrees when printing so that the resulting sheet is printed in a landscape orientation. In contrast, referring additionally to FIG. 9, a wide greeting card 76 that includes a horizontal fold 78 can be viewed using the template and printed as a portrait sheet, i.e., printed in a portrait orientation. Yet during printing, the top portion 80 of the first surface 82 of the portrait sheet 84 has indicia 86 that is rotated 180 degrees from the orientation of the indicia 88 printed on the second surface 90.

Figure 10:
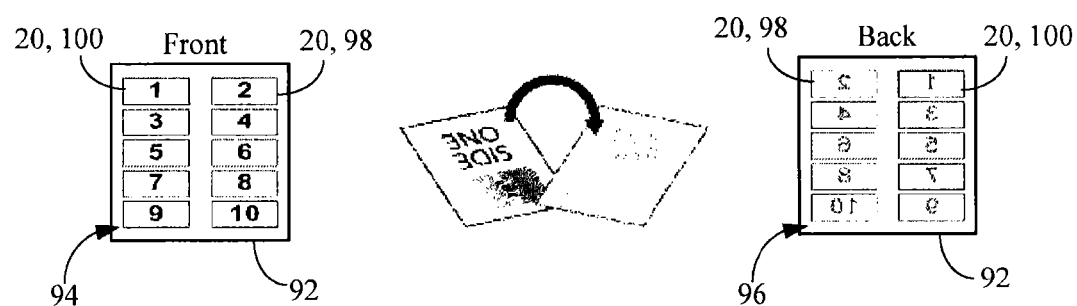
FIG. 10 includes views of an example sheet of business cards including plan views of the sheet's front or first surface and back or second surface, and a perspective view of the process for flipping the sheet.

Referring additionally to FIG. 10, when a sheet 92 of business cards 20 is created using a template 60, the front or first surface 94 of sheet of business cards, when viewed by a user 58 (looking left to right, and then top and down), does not match the back or second surface 96 of the sheet. When editing the back surface of the sheet, it would be easy to erroneously assume that the second business card 98 is actually the first business card 100.

When it comes time for the user 58 to print the sheet 92 of business cards 20, the user inserts the sheet into the printer 32 to print the top surface 94, and then, reinserts the sheet into the printer to print the back surface 96. Both printing steps occur in the portrait orientation. However, issues can arise with respect to making sure that the back surface is printed correctly with respect to the front surface.

Figure 11:
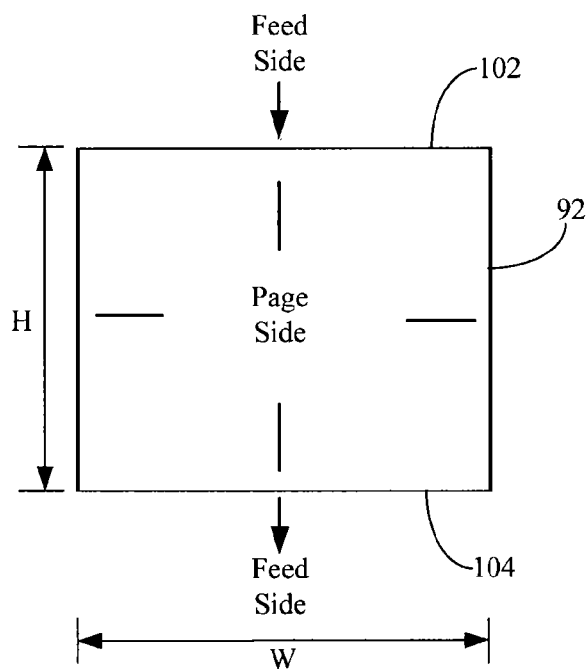
FIG. 11 includes a plan view of an example sheet illustrating the feed sides, page side, height, and width of the sheet.

Referring additionally to FIG. 11, reinsertion of the sheet 92 of business cards 20 into the printer 32 requires an understanding of the feed side and the page side of the sheet by the user 58. The feed side refers to the edges 102 and 104 of the sheet 92, while the page side refers to the 2D view of the sheet including its full width ("W") and height ("H"). Different designs/items require different feed sides to be inserted. For example, a greeting card 72 and 76 requires that after a first feed side is inserted into the printer, that the opposite feed side (the one opposite from the first feed side) be reinserted to print the other side of the sheet. In contrast, the printing of a postcard 16 requires that the same feed side be reinserted into the printer to print the second side of the sheet 48 of postcards.

As previously discussed, different printers 52 and 54 require that different page sides be inserted. For example, as shown in FIG. 3A, a bottom feed printer 52 requires that the page side 106, i.e., the side on which the sheet is to be printed, be inserted into the printer upside down. In contrast, as shown in FIGS. 3B and 3C, a top-feed printer 54 requires that the page side be inserted right-side up. Accordingly, between the various designs of the items 10 that can be printed, and the variation in printer types, attempting to determine the various orientations for viewing and printing can be very confusing. The embodiments of the present invention simply this process for consumers/users so they are able to easily create, view, and/or print various item designs across various printers.

Embodiments of the present invention include a program for creating, generating, and/or manipulating a template 60 and method that is configured to be used to facilitate the creation, viewing, and printing of various designs/items 10 across a variety of printers 32 without requiring the user 58 to keep track of the special viewing/printing conditions of each design/item and each printer type 52 and 54. As mentioned above, the issues include the following: the differences between an efficient design view while ensuring correct printing, the differences between the type and quantity of designs/items 12-20 on both sides 24, 28, 82, 90, 94, and 96 of a sheet 40-50 and 92 and the effect of the designs on the reinsertion process associated with the sheet, the differences between common types of consumer printers and their associated effect on the page insertion process, the difference in portrait and landscape page orientation versus the various designs, e.g., the tall and wide greeting card designs 72 and 76, respectively, and the ability to apply a consistent set of rules to editing and printing different designs. The embodiments of the present invention eliminate the need for a user to work out all of these issues for themselves while viewing and/or prior to printing the double-sided items.

Design View

Referring again to FIGS. 1, 2, 4, 5, 6, and 10, the concept of "design view" refers to how consumers/users 58 preview a to-be-printed item 10 using a graphical representation of a sheet 40-50 and 92 that includes the double-sided item(s), also referred to as a template 60, that is displayed on a computer screen 66 during the editing process. Users expect to view each specific area, e.g., the front face 22, the inside surface 24, and the back face 26 of a greeting card 12, of an item that is presented in the template in an orientation that is useful for applying/modifying indicia 21, e.g., the text and/or graphics, on the item. A user expects that the indicia will be presented right-side-up, and read/viewed from left to right across the computer screen. Yet, as was discussed above in reference to the note card 12 example, the front face and the back face are grouped together on one side/surface 28 of the printable sheet 42 with the indicia, e.g., the text and/or graphic, on the back face being rotated 180 degrees, or inverted, when printing. Embodiments of the present invention advantageously do not present the user with the inverted text during editing, which would only add to user confusion. A user would not want to see the flipped/inverted indicia. Similarly, for other items, the indicia's print orientation can be 90 degrees out of phase with the indicia's view orientation, i.e., the orientation of the indicia as viewed by the user on the computer screen. Again, the indicia's view orientation on the computer screen is set so the user does not have to view rotated indicia.

Additionally, embodiments also correct for the view orientation of the indicia 21 that is displayed using the template 60 on the computer monitor screen 66 so that the indicia that is inverted for the printing process, also referred to as the print orientation of the indicia, is not viewed by the user 58 in its inverted state. During the correction process, the view orientation of the indicia is compared to the vertical orientation of the computer screen (noted in FIG. 6 by the arrow labeled "VO"), and the indicia's view orientation is adjusted to match the vertical orientation of the computer screen, if it does not already match. For example, as was previously discussed in the greeting card 12 example, the printable sheet 42 had to be reinserted into the printer 32 with the opposite feed-side so as to invert the print of the greeting card. When editing, a user does not want to view the upside down indicia that is to be printed on the inside surface of the greeting card.

In addition to correcting the view orientation, i.e., the directional orientation, of indicia 21 that will ultimately be inverted when printed, embodiments of the present invention also correct the positional order of the items 10 when more than one double-sided item is present in a sheet 40. For example, as was previously discussed, a sheet 92 of double-sided business cards 20 can raise issues as to the position of the cards when the sheet is flipped for reinsertion into a printer 32. In particular, the order of business cards when viewing the back surface 96 of the sheet of business cards does not match the order when viewing the front surface 94 of the sheet. Accordingly, the embodiments of the present invention provide a user 58 with an effective design view that corrects the view seen by a user when looking at the design's template 60 on the computer screen 66 and/or editing the design. This effective design view corrects for inverted indicia and the relative position of more than one item on a sheet.

Figure 12:
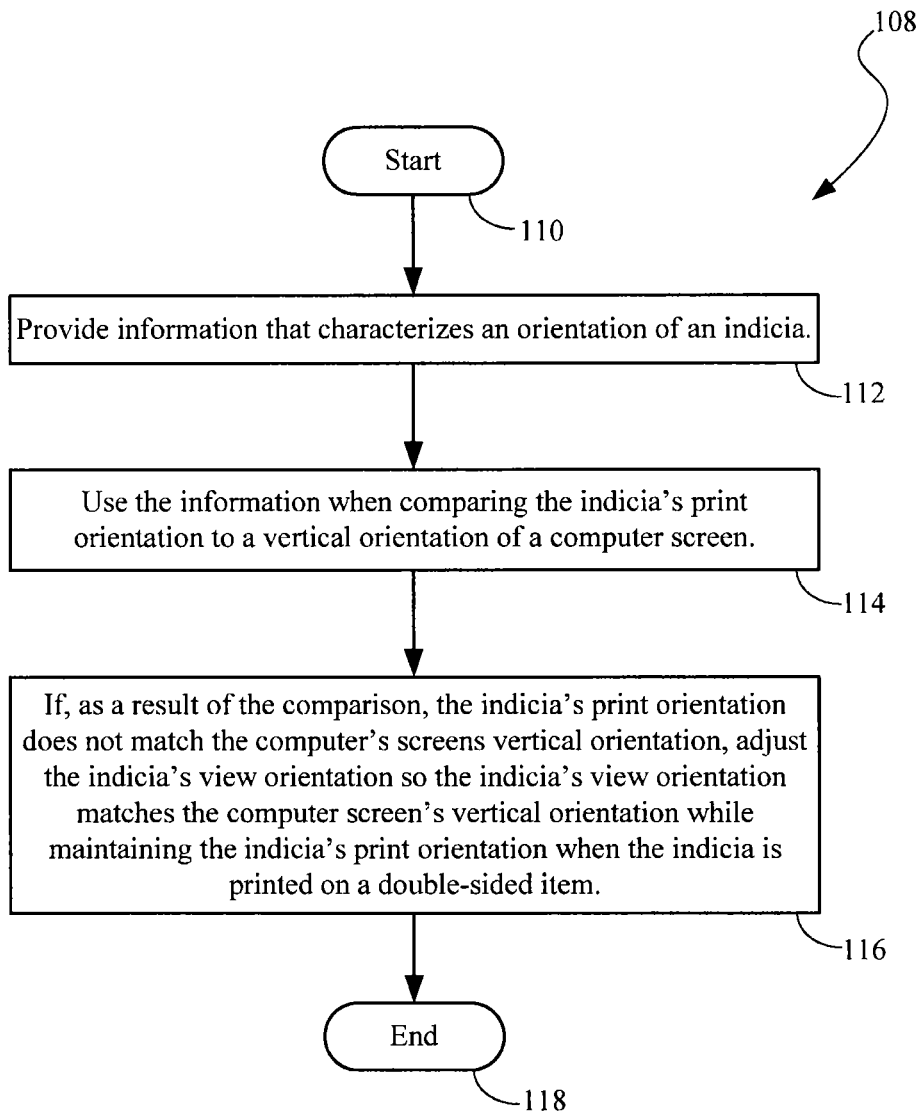
FIG. 12 is a flowchart of an example method for displaying indicia that is to be printed on a double-sided item on a computer screen for viewing by a user according to the invention.

Referring additionally to FIG. 12, an exemplary method for displaying indicia 21 that is to be printed on a double-sided item 10 on a computer screen 66 for viewing by a user 58 according to the present invention is illustrated in algorithm 108. The double-sided item has a first surface 28, 82, and 94 and a second surface 24, 90, and 96. The indicia have a print orientation when the indicia is printed on the item's first and second surfaces. The indicia have a view orientation when the indicia are displayed on the computer screen, and the computer screen has a vertical orientation. After starting the method at step 110, the next step 112 is to provide information that characterizes the print orientation of the indicia. Next, at step 114, the information is used when comparing the indicia's print orientation to a vertical orientation "VO" of the computer screen. Next, at step 116, if, as a result of the comparison, the indicia's print orientation does not match the computer screen's vertical orientation, the indicia's view orientation is adjusted so the indicia's view orientation matches the computer screen's vertical orientation. The indicia's print orientation, when the indicia are printed on the double-sided item, is maintained. The method ends at step 118.

View Normalization

Figure 13:
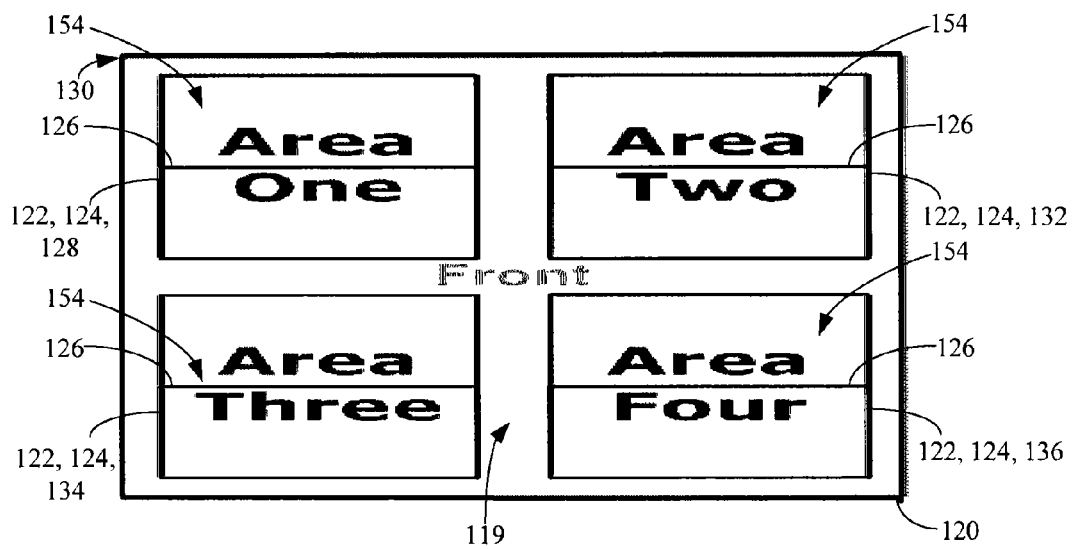
FIG. 13 is a plan view of a front or first surface of an example sheet of double-sided folded business cards.

Referring additionally to FIG. 13, an example of a case for view normalization is a front or first surface 119 of a sheet 120 containing four double-sided and folded business cards 122. As shown in FIG. 13, four blocks 124, each of which represents a folded business card, are shown on the sheet, each block is assigned a sequential number, e.g., one, two, three, and four. A horizontal fold line 126 is shown across the center of each block.

Figure 14:
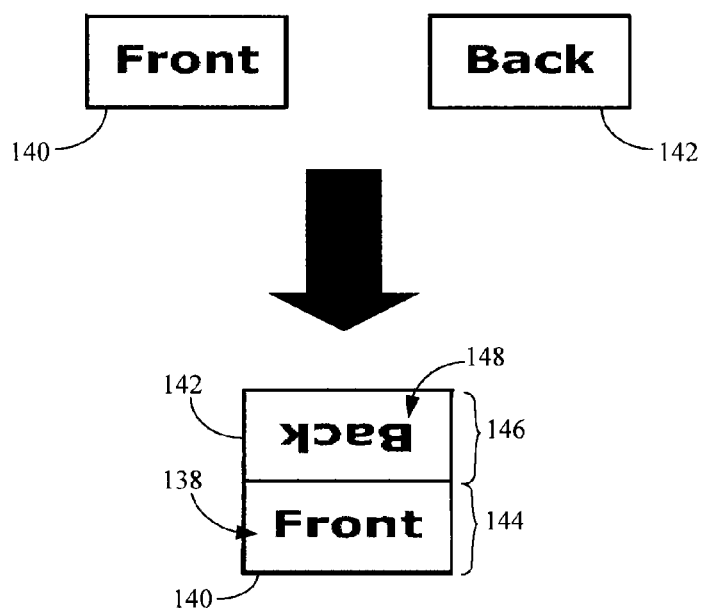
FIG. 14 includes plan views of the front face and back face of a folded business card of FIG. 13, and a plan view of the front or first surface of an unfolded version of one of the business cards of FIG. 13 showing the front and back faces.

The four blocks 124 have been arranged with the first block 128 in the top left corner 130 of the sheet 120 and then the other three blocks, i.e., the second block 132, third block 134, and fourth block 136, are positioned on the sheet following the normal U.S. and Western European reading pattern of left-to-right and then top-to-bottom. So, referring additionally to FIG. 14, the resulting view of the top or first surface 138 of the sheet 120 shows the front face 140 and the back face 142 of each of the four double-sided folded business cards 122 in an efficient design view order. The lower section 144 of each block 124 represents the front face of each card, and the upper section 146 represents the back face of each card. As indicated in FIG. 14, compared to the design view that is shown in the template 60, the indicia 148 that is associated with the upper section, which represents the back face of the card, should be rotated 180 degrees so it will be printed in the correct orientation so that when the business card is folded, the printed indicia is right-side up.

Figure 15:
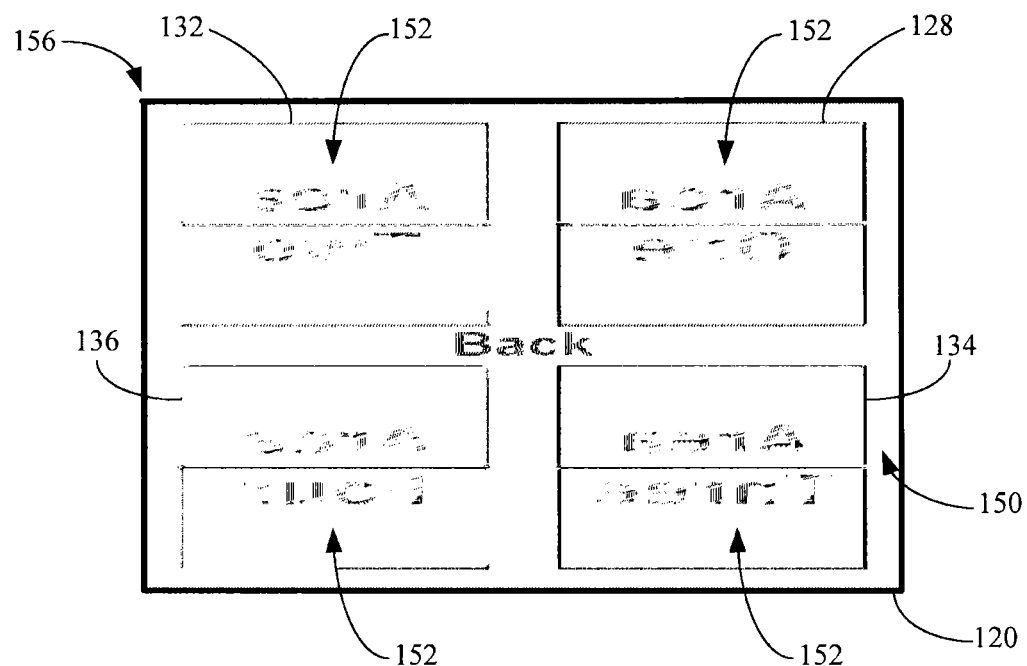
FIG. 15 is a plan view of a back or second surface of the example sheet of double-sided folded business cards of FIG. 13.

Referring additionally to FIG. 15, which is a view of the back or second surface 150 of the sheet 120 that includes the four double-sided folded business cards 122 shown in FIG. 13, if a user 58 was to turn the sheet over and view the back surface, and if the paper was thin enough to permit seeing the four blocks 124 that have been printed on the front surface 119, a users would then see a mirror image 152 of the indicia 154 printed on the front surface. Seeing the indicia, e.g., text, backward, as a mirror images is not significant to printing since the indicia, e.g., the text and/or graphics, on the front surface of the sheet will not be printed on the back surface. However, what is significant is the arrangement of the blocks.

Figure 16:
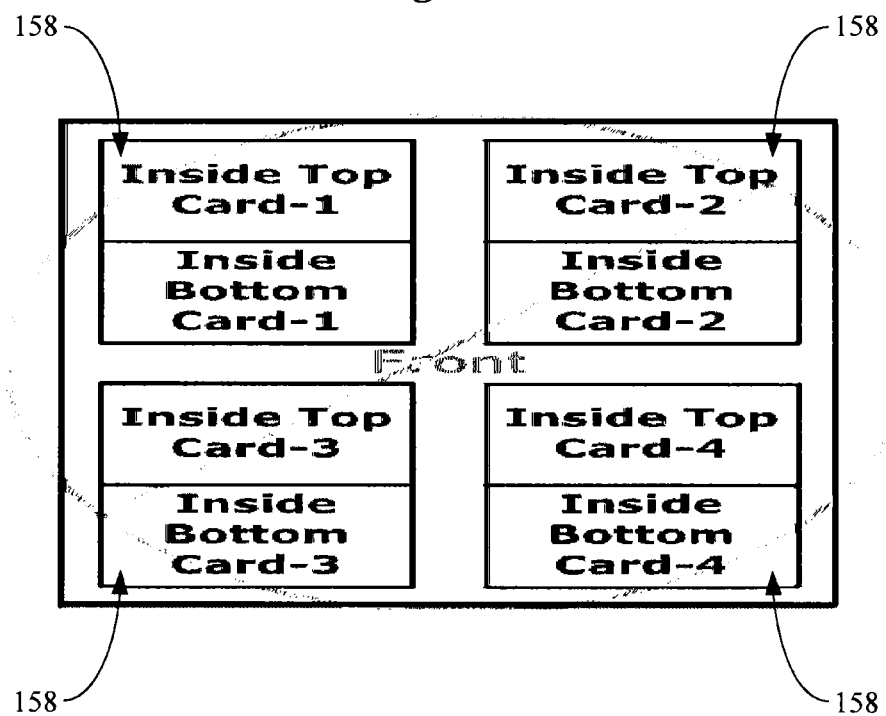
FIG. 16 is a plan view of an incorrect assumption regarding the configuration of the back or second surface of the example sheet of double-sided folded business cards of FIG. 13.

When first viewing the first surface 119, a user 58 sees that the blocks 124 are arranged from left-to-right and top-to-bottom across the sheet 120. When viewing the back surface 150, a user sees the second block 132 in the top left corner 156 of the sheet 120. When considering this from a print-standpoint, this seems natural. However, when a user is editing a design using a template 60 presented on the computer screen 66, the user expects to see the inside surface 158 of each card 122 positioned from left-to-right and top-to-bottom, just as was done for the front surface 119 of the sheet (see FIG. 16). However, this assumption by the user regarding the relative locations of each of the blocks 124 on the front and back surfaces 119 and 150, respectively, is not correct. Accordingly, a different set of rules is needed for the reverse-side design view. The user is presented with each object, e.g., block 124, separated from the group of objects (as in their normal page orientation) but in a way that replicates how they might expect to see them on the page/sheet.

Figure 17:
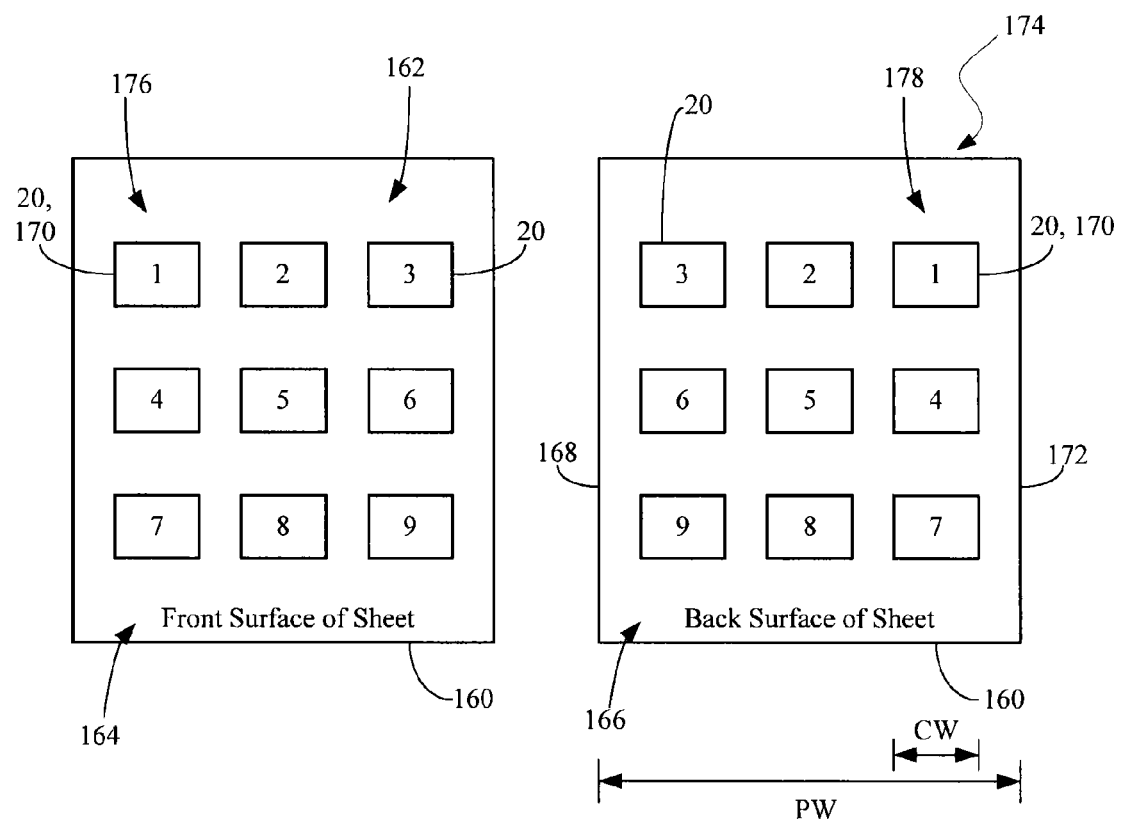
FIG. 17 includes a plan view of the front or first surface of a sheet of nine business cards and a plan view of the back or second surface of the sheet of nine business cards.

A specific example of a sheet 160 that includes nine business cards 20 in a three-across and three-down configuration 162 is shown FIG. 17. The left-hand side of FIG. 17 illustrates a view of the front or first surface 164 of the sheet, and the right-hand side of FIG. 17 illustrates a view of the bottom or second surface 166 of the sheet. As shown in FIG. 17, the relative location of each of the nine business cards changes depending upon which surface of the sheet is viewed.

Example embodiments apply a vertical reorder pattern to the view orientation of the back surface 166 of the sheet 160 that is shown in right-hand side of FIG. 17. This involves calculating the distance, also referred to as a dimension, of each of the business cards 20 relative to one edge of the sheet 168. For example, the distance of a business card from the left-hand edge 168 of the sheet now gives the appearance as if it is being measure from the right-hand edge. That is, if the first card 170 is 1 inch from the left-hand edge of the sheet when viewing the front surface 164 of the sheet, and the sheet is 8 inches across, then, the new measurement for that individual card is 7½ inches from the left-hand edge 168 of the sheet when viewing the back surface of the sheet (or 1 inch from the right-hand edge 172 of the sheet's back surface). This calculation can be determined using the following equation:

$$NP = PW - CP - CW$$

where:

NP=New "Design" Position from the left edge of the sheet's back surface

PW=Page Width

CP=Card Position (also referred to as print location) from the left edge of the sheet's front surface CW=Width of the Card The following table shows the various values of PW, CP, CW, and NP for each of the nine cards shown in FIG. 13.

| Card Number | Page Width ("PW") in inches | Card Position ("CP") in inches | Card Width ("CW") in inches | New Design Position ("NP") in Inches |
|---|---|---|---|---|
| 3, 6, 9 | 8.5 | 0.25 | 2 | 6.25 |
| 2, 5, 8 | 8.5 | 3.25 | 2 | 3.25 |
| 1, 4, 7 | 8.5 | 6.25 | 2 | 0.25 |

All rows of business cards 20 on the screen follow this same approach. This gives the appearance, when the user 58 views the back surface 166 of the sheet using the template 60, that the business card that physically is on the right-hand side of the back surface of the sheet is swapped with the card on the left-hand side of the sheet's back surface. Thus, when viewing the sheet's back surface with the template, the user see the back surface just as he or she would see the sheet's front surface 164, and therefore, eliminates the potential for user confusion during editing. In this embodiment, the view orientation of each of the items 10 on the computer screen 66 for the back surface of the sheet matches the print location of the same items on the sheet's front surface.

Referring again to FIG. 9, in the instance with greeting cards 12 that also require the reverse or back surface 28 to be flipped, the greeting cards are displayed for the user 58 so the second surface of the sheet 84 is right side up, and then, anomalies associated with the actual orientation of the indicia 86 and 88 on the greeting cards is dealt with when the greeting cards are printed. In example situations where a sheet includes cards having different sizes, the sheet's back surface is always presented to the user right side up, and including the card width ("CW") in the design view reorder calculation when creating the template presentation for the user. The program that implements the design view reorder calculation also is used to build the template in a portrait layout for printing, but provides enough information so as to present the sheet in landscape orientation in the design view, which might also be used for printing.

Figure 18:
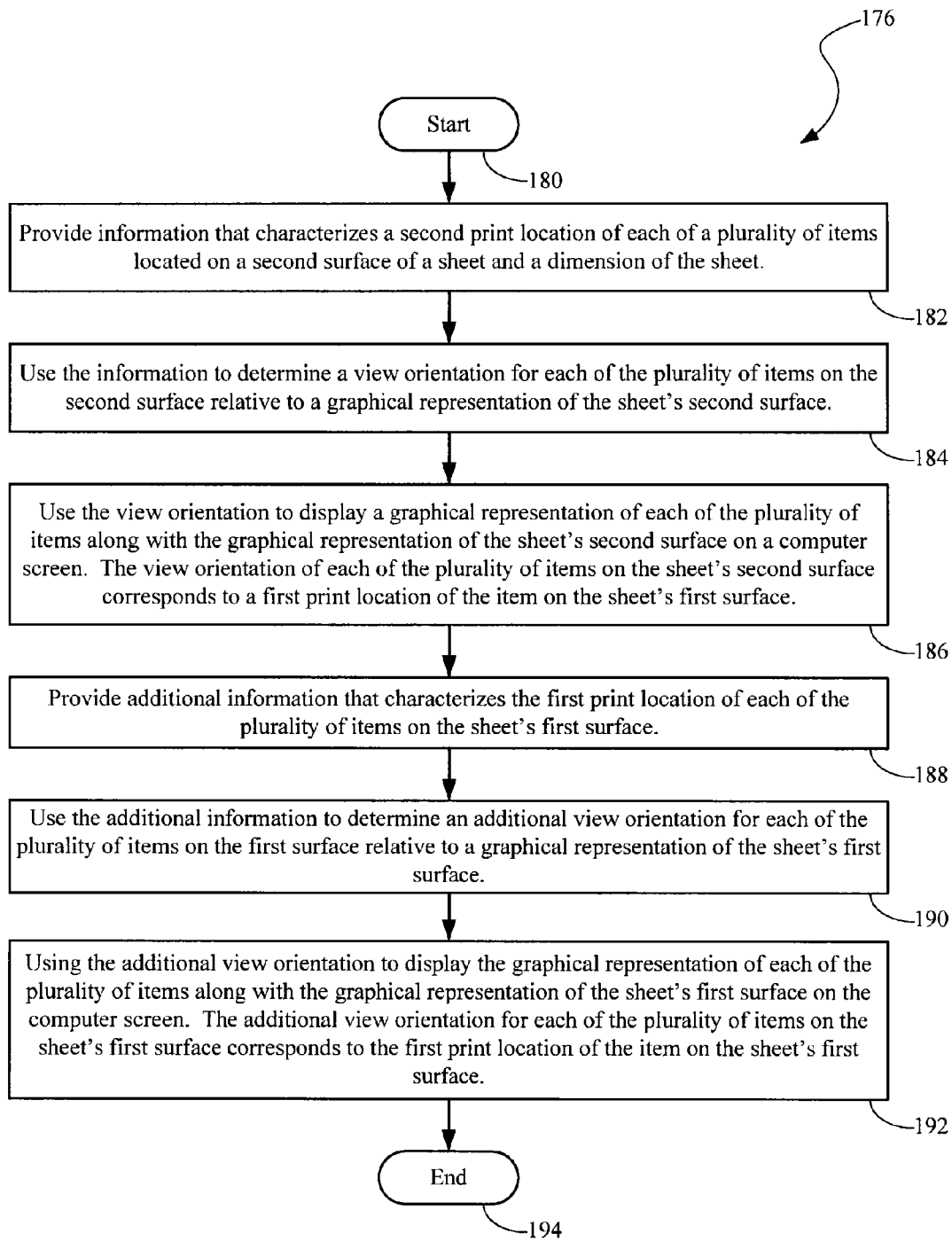
FIG. 18 is a flowchart of an example method for displaying a graphical representation of a sheet that includes a plurality of double-sided items on a computer screen for viewing by a user according to the invention.

Referring again to FIGS. 6 and 17, and additionally to FIG. 18, an exemplary method for displaying a graphical representation of a sheet 160, e.g., a template 60, that includes a plurality of double-sided items 174 on a computer screen 66 for viewing by a user 58 according to the present invention is illustrated in algorithm 176. The word "plurality" means two or more throughout this document. The sheet has a first surface 164, a second surface 166, and a dimension that is measured across at least a portion of the sheet. The sheet is configured to be printed with indicia 21 on both the first and second surfaces. Each of the plurality of double-sided items has a first print location 176 on the first surface and a second print location 178 on the second surface. After starting the method at step 180, the next step 182 is to provide information that characterizes the second print location of each of the plurality of items, i.e., double-sided items, located on the second surface of the sheet and the dimension of the sheet. Next, at step 184, the information is used to determine a view orientation for each of the plurality of items on the second surface relative to a graphical representation of the sheet's second surface 64. Next, at step 186, the view orientation is used to display a graphical representation of each of the plurality of items along with the graphical representation of the sheet's second surface on a computer screen 66. The view orientation of each of the plurality of items on the sheet's second surface corresponds to a first print location of the item on the sheet's first surface.

At step 188, additional information is provided that characterizes the first print location 176 of each of the plurality of items 174 on the sheet's first surface 164. Next, at step 190, the additional information is used to determine an additional view orientation for each of the plurality of items on the first surface relative to a graphical representation of the sheet's first surface 62. At step 192, the additional view orientation is used to display the graphical representation of each of the plurality of items along with the graphical representation of the sheet's first surface on the computer screen 66. The additional view orientation for each of the plurality of items on the sheet's first surface corresponds to the first print location of the item on the sheet's first surface. The method ends at step 194.

Printer Reinsertion.

Referring again to FIGS. 2, 5, and 6, after the user 58 uses the template 60 of the item 10 to design the items e.g., adding indicia 21 to the items the sheet 40 of item(s) that is going to be printed needs to be inserted into the printer 32. Yet, the reality of the physical sheet has been abstracted via a design view 62 and 64. So, the concern becomes how do ensure that the printing will occur correctly. First of all, the program/software does not know if the sheet's back surface 24 should be flipped upside down for printing (in order for the card 14 to be right side up in design view). As such, each template program includes a flag that notifies the program/software that the sheet's back surface intentionally needs to be flipped. In one example embodiments, the user could be notified by the program during printing of the need to flip the sheet, if appropriate. In other example embodiments, the program, when issuing commands to a dual-sided printer to print the items will prompt the dual-sided printer to flip the sheet. In this case, when the flag is found in a software template, the back surface of a sheet is simply rendered upside-down when printing. Everything is in its place, but is now upside down.

Again, the goal is to not have a user 58 view the back face 26 of the card 14 upside down when designing the layout of the item 10 using the template 60. Thus, the back face is in a design friendly orientation, which is not always printer friendly. The program tracks the front/back and rotational relationships of the individual items relative to the original layout of the blank printable stock. After the sheet's front face 22 is printed, the program allows the user to reinsert the stock the same way. The location and rotation of the items on the sheet's back surface 24 is handled by the program, so the user is spared the task of this analysis.

All of the features disclosed in the specification, including the claims, abstract, and drawings, and all of the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

We claim:

1. A method for displaying indicia that is to be printed on a double-sided item on a computer screen for viewing by a user, wherein the double-sided item has a first surface and a second surface, the indicia has at least one print orientation when the indicia is printed on the item's first and second surfaces, the indicia has at least one view orientation when the indicia is displayed on the computer screen, and the computer screen has a vertical orientation, the method comprising:
   a. providing information that characterizes the indicia's at least one print orientation;
   b. using the information to compare the indicia's at least one print orientation to the computer screen's vertical orientation; and
   c. if, as a result of the comparison, the indicia's at least one print orientation does not match the computer screen's vertical orientation, adjusting the indicia's at least one view orientation so the indicia's at least one view orientation matches the computer screeds vertical orientation while maintaining the indicia's at least one print orientation when the indicia is printed on the double-sided item.

2. The method according to claim 1, wherein the step of adjusting the indicia's at least one view orientation involves rotating the indicia's at least one view orientation 180 degrees if the indicia's at least one print orientation is inverted with respect to the computer screen's vertical orientation.

3. The method according to claim 1, wherein the step of adjusting the indicia's at least one view orientation involves rotating the indicia's at least one view orientation 90 degrees if the indicia's at least one print orientation is perpendicular to the computer screen's vertical orientation.

4. The method according to claim 1, wherein the step of adjusting the indicia's at least one view orientation ensures that the user will view the indicia right side up on the computer screen.

5. The method according to claim 1, further comprising providing a graphical representation of a sheet that includes the double-sided item and is configured to be displayed on the computer screen for viewing by the user, wherein the indicia is displayed on the computer screen in conjunction with the graphical representation of the sheet.

6. The method according to claim 5, wherein the graphical representation of the sheet that includes the double-sided item is a template.

7. The method according to claim 1, wherein the double-sided item is selected from the group consisting of a note card, a greeting card, a postcard, a brochure, and a business card.

8. A non-transitory computer-readable medium that is configured to interface with a computer and contains a program that is configured to prompt the display of indicia that is to be printed on a double-sided item on a computer screen for viewing by a user, wherein the double-sided item has a first surface and a second surface, the indicia has at least one print orientation when the indicia is printed on the item's first and second surfaces, the indicia has at least one view orientation when the indicia is displayed on the computer screen, and the computer screen has a vertical orientation, the program comprising information that is used to prompt the display of the indicia on the computer screen, wherein:

a. the program receives data that characterizes the indicia's at least one print orientation and the computer screen's vertical orientation;
   b. the program uses the data during a comparison of the indicia's at least one print orientation to the computer screen's vertical orientation; and
   c. if the program determines, as a result of the comparison, that the indicia's at least one print orientation does not match the computer screen's vertical orientation, the program adjusts the indicia's at least one view orientation so the indicia's at least one view orientation matches the computer screens vertical orientation while maintaining the indicia's at least one print orientation when the indicia is printed on the double-sided item.

9. The non-transitory computer-readable medium according to claim 8, wherein the program further comprises additional information that the program is configured to use to adjust the indicia's at least one view orientation to ensure that the user will view the indicia right side up on the computer screen.

10. The non-transitory computer-readable medium according to claim 8, wherein the program further comprises additional information that the program is configured to use to prompt the printing of the indicia on the double-sided item by a printer that is coupled to the computer.

11. The non-transitory computer-readable medium according to claim 10, wherein the printer is selected from the group consisting of a top-feed printer and a bottom-feed printer.

12. The non-transitory computer-readable medium according to claim 10, wherein the program further comprising a flag that is configured to prompt the printer to print the indicia on the double-sided item in an inverted manner.

13. A method for displaying a graphical representation of a sheet that includes a plurality of double-sided items on a computer screen for viewing by a user, wherein the sheet has a first surface, a second surface, and at least one dimension, the sheet is configured to be printed with indicia on both the first surface and the second surface of the sheet, and each of the plurality of double-sided items has a first print location on the first surface and a second print location on the second surface, the method comprising:
   a. providing information that characterizes the second print location of each of the plurality of double-sided items on the sheet's second surface and the at least one dimension of the sheet;
   b. using the information to determine a view orientation for each of the plurality of double-sided items on the second surface relative to a graphical representation of the sheet's second surface;
   c. using the view orientation to display a graphical representation of each of the plurality of double-sided items along with the graphical representation of the sheet's second surface on the computer screen; and
   d. wherein the view orientation for each of the plurality of double-sided items on the sheets second surface corresponds to the first print location of the item on the sheet's first surface.

14. The method according to claim 13, further comprising:
   a. providing additional information that characterizes the first print location of each of the plurality of double-sided items on the sheet's first surface;
   b. using the additional information to determine an additional view orientation for each of the plurality of double-sided items on the first surface relative to a graphical representation of the sheet's first surface;

c. using the additional view orientation to display the graphical representation of each of the plurality of double-sided items along with the graphical representation of the sheet's first surface on the computer screen; and
d. wherein the additional view orientation for each of the plurality of double-sided items on the sheet's first surface corresponds to the first print location of the item on the sheet's first surface.

15. The method according to claim 13, wherein the double-sided item is selected from the group consisting of a note card, a greeting card, a postcard, a brochure, and a business card.

16. A non-transitory computer-readable medium that is configured to interface with a computer and contains a program that is configured to prompt the display of a graphical representation of a sheet that includes a plurality of double-sided items on a computer screen for viewing by a user, wherein the sheet has a first surface, a second surface, and at least one dimension, the sheet is configured to be printed with indicia on both the first surface and the second surface of the sheet, and each of the plurality of double-sided items has a first print location on the first surface and a second print location on the second surface, the program comprising information that is used to prompt the display of the graphical representation of the sheet on the computer screen, wherein:
  a. the program receives data that characterizes the second print location of each of the plurality of double-sided items on the sheet's second surface and the at least one dimension of the sheet;
  b. the program uses the data to determine a view orientation for each of the plurality of double-sided items on the second surface relative to a graphical representation of the sheet's second surface;
  c. the program uses the view orientation to display a graphical representation of each of the plurality of double-sided items along with the graphical representation of the sheet's second surface on the computer screen; and
  d. wherein the view orientation for each of the plurality of double-sided items on the second surface corresponds to the first print location of the item on the first surface for the item.

17. The non-transitory computer-readable medium according to claim 16, wherein the program further comprises additional information that the program is configured to use to do the following:
  a. characterize the first print location of each of the plurality of double-sided items on the sheet's first surface;
  b. determine an additional view orientation for each of the plurality of double-sided items on the first surface relative to a graphical representation of the sheet's first surface;
  c. use the additional view orientation to prompt the display of the graphical representation of each of the plurality of double-sided items along with the graphical representation of the sheet's first surface on the computer screen; and
  d. wherein the additional view orientation for each of the plurality of double-sided items on the sheet's first surface corresponds to the first print location of the item on the sheet's first surface.

18. The computer-readable medium according to claim 16, wherein the program further comprises additional information that the program is configured to use to prompt the printing of the indicia on the sheet by a printer that is coupled to the computer.

19. The non-transitory computer-readable medium according to claim 18, wherein the program is configured to include additional information that the program is configured to use to prompt the user to reinsert the sheet into the printer in a specific sheet orientation after indicia has been printed on the sheet's first surface.

20. The non-transitory computer-readable medium according to claim 16, wherein the program further includes additional information that the program is configured to use to prompt the display of each of the plurality of double-sided items on the computer screen in a portrait orientation even if the sheet will be printed in a landscape orientation.

* * * * *